United States Patent [19]

Sato et al.

[11] Patent Number: 4,946,915
[45] Date of Patent: Aug. 7, 1990

[54] METHOD FOR PREPARING LIGHT-COLORED INDENE-COUMARONE RESIN

[75] Inventors: Hisatake Sato; Masaharu Makino, both of Yokohama, Japan

[73] Assignee: Nippon Oil Company Ltd., Japan

[21] Appl. No.: 288,468

[22] Filed: Dec. 22, 1988

[30] Foreign Application Priority Data

Dec. 29, 1987 [JP] Japan .................................. 62-332279

[51] Int. Cl.$^5$ ................................................ C08F 4/14
[52] U.S. Cl. ..................................... 526/237; 526/267
[58] Field of Search ................................ 526/267, 237

[56] References Cited

U.S. PATENT DOCUMENTS 4,558,107  12/1985  Evans et al. ......................... 526/237

FOREIGN PATENT DOCUMENTS 310816  7/1930  United Kingdom ................ 526/267

Primary Examiner—Joseph L. Schofer
Assistant Examiner—A. H. Walker
Attorney, Agent, or Firm—Ostrolenk, Faber, Gerb & Soffen

[57] ABSTRACT

A method for preparing a light-colored indene-coumarone resin is here disclosed which comprises the step of polymerizing an aromatic coal fraction raw material having a boiling point of 140° to 240° C. in the presence of a Friedel-Crafts type catalyst in a polymerization reactor in which the amount of oxygen is restricted to 15 ml or less with respect to 100 g of the aromatic coal fraction raw material oil at room temperature. As a raw material, a mixture is also used which is composed of the above-mentioned aromatic coal fraction and a phenol in an amount of 3 to 30 parts by weight with respect to 100 parts by weight of the aromatic coal fraction.

4 Claims, No Drawings

METHOD FOR PREPARING LIGHT-COLORED INDENE-COUMARONE RESIN

BACKGROUND OF THE INVENTION (1) Field of the Invention

The present invention relates to a method for preparing an indene-coumarone resin having a good hue. More specifically, the present invention relates to a method for preparing a light-colored indene-coumarone resin by adjusting the amount of oxygen in a polymerization reactor to a certain level or less, when an aromatic coal fraction raw material oil is polymerized.

(2) Description of the Prior Art

Indene-coumarone resins are used as tackifiers for synthetic rubbers and as resins for coating materials, but their use applications are limited because of bad hues. Heretofore, any attempts have not been made to prepare light-colored indene-coumarone resins by regulating manufacturing conditions for the resins.

SUMMARY OF THE INVENTION

An object of the present invention is to improve the hue of an indene-coumarone resin in order that the resin may be employed as a material which must be a light color, for example, as a tackifier for hot-melt adhesives and for acrylic adhesives, or as a binder for light-colored coating materials.

According to the present invention, the above-mentioned conventional problem can be solved by polymerizing an aromatic coal fraction raw material having a boiling point 140 to 240° C. in the presence of a Friedel-Crafts type catalyst in a polymerization reactor in which the amount of oxygen is restricted.

That is, the present invention is directed to a method for preparing a light-colored indene-coumarone resin which comprises the step of polymerizing an aromatic coal fraction raw material having a boiling point 140° to 240° C. or a mixture of the aromatic coal fraction and a phenol in an amount of 1 to 30 parts by weight with respect to 100 parts by weight of the aromatic coal fraction in the presence of a Friedel-Crafts type catalyst in a polymerization reactor in which the amount of oxygen is restricted to 15 ml or less with respect to 100 g of the aromatic coal fraction raw material oil at room temperature.

DETAILED DESCRIPTION OF THE INVENTION

An aromatic coal fraction raw material oil used in the present invention is a fraction having a boiling point of 140° to 240° C. obtained from a gas oil recovered from a coke oven gas, or coal tar generated from a coke oven at the time of coal carbonization. Generally, in this fraction having a boiling point of 140° to 240° C., there are contained aromatic olefins having 8 to 10 carbon atoms such as styrene, alkylstyrenes, indene, alkylindenes, coumarone, alkylcoumarones and the like in a proportion of 35 to 75% by weight. If necessary, prior to using, such a fraction may be subjected to refining steps, i.e., dealkalization and deacidification such as an acid treatment, an alkali treatment and water washing.

Furthermore, in the present invention, a mixture of the above-mentioned aromatic coal fraction and a phenol can be also used as a raw material.

The amount of the phenol to by used is usually in the range of 1 to 30 parts by weight, preferably 2 to 20 parts by weight, with respect to 100 parts of the aromatic coal fraction.

When the phenol is added to the aromatic coal fraction raw material, particularly when the phenol used in a relatively large amount of 3 parts by weight to the raw material oil (Japanese Patent Application Nos. 279964/1986, 22791/1987 and 24275/1964), the hue of a obtained therefrom tends to noticeably deteriorate. In such a case where the phenol is used in a relatively great amount, the improvement effect of the resin hue by the method of the present invention is remarkable.

Examples of the phenols used in the present invention include phenol, cresol, xylenol, t-butyl phenol and nonyl phenol. They may be used alone or in the form of a mixture of two or more thereof.

In the present invention, the raw material oil is polymerized in the presence of a Friedel-Crafts type catalyst. A polymerization temperature is in the range of 30° to 120° C., and a polymerization time is in the range of about 10 minutes to about 5 hours.

As the catalyst, a Friedel-Crafts type compounds is used, and examples of such compounds include boron trifluoride, aluminum chloride, boron trifluoride phenol complex compound and boron trifluoride dialkyl ether complex compound. The amount of the Friedel-Crafts type compound is in the range of 0.05 to 5% by weight, preferably 0.1 to 3% by weight.

In performing the polymerization, the amount of oxygen in a polymerization reactor is adjusted to 15 ml or less, preferably 10 ml or less, with respect to 100 g of the raw material oil at room temperature.

If the oxygen concentration in the reactor is in excess of 15 ml with respect to 100 g of the raw material oil, any resin having a good hue cannot be obtained.

In order to decrease the oxygen amount in the reactor, the atmosphere in the reactor is replaced with an inert gas. The usable inert gas is a nitrogen gas, a carbon dioxide gas, a helium gas, a neon gas or an argon gas, but the nitrogen gas is most preferable from an economical viewpoint.

Generally, after the polymerization, the catalyst is decomposed with an alkali such as caustic soda or sodium carbonate, and the decomposed catalyst is then removed from the system by water washing. Afterward, unreacted materials and low polymers are removed therefrom by an operation such as evaporation or distillation, thereby obtaining the refined resin of the present invention.

In the present invention, an aromatic petroleum fraction may be mixed with the raw material oil in a ratio of 10 parts by weight of the former to 100 parts of the latter. When the amount of the aromatic petroleum fraction is in excess of 10 parts by weight, the yield of the desired resin drops unpreferably. The aromatic petroleum fraction is a petroleum fraction having a boiling point of 140° to 240° C. which can be formed at the time of thermal decomposition such as steam decomposition of a petroleum fraction such as naphtha, kerosine or gas oil.

Now, the present invention will be described in detail in accordance with examples.

EXAMPLE 1

In this example, experiments were made for three samples.

A tar gas oil obtained from coal tar was distilled to prepare a fraction having a boiling point of 176° to 190° C. This fraction contained 54.0% of indene and methylindene, 6.8% of coumarone and methylcoumarone and 7.6% of other unsaturated components.

In each of one-liter stainless steel autoclaves equipped with a stirrer and a thermometer, 300 g of the thus prepared fraction and 30 g of phenol were placed. The atmosphere in the autoclave was then replaced with a nitrogen gas in order to decrease the amount of oxygen therein. When measured by the use of a gas chromatograph, it was confirmed that amounts of oxygen in the three autoclaves were 3.2 ml, 7.5 ml and 12.8 ml, respectively. Afterward, the system in each autoclave was heated up to about 50° C., and as a catalyst, 0.6 part by weight of boron trifluoride phenol complex compound was added dropwise to each autoclave over about 30 minutes while the temperature in the system was maintained at a level of 60° to 65° C. and while a pressure was applied thereto with the nitrogen gas. After the system had been kept up at this temperature for 2 hours to perform polymerization, the used catalyst was decomposed with an aqueous caustic soda solution and was then removed therefrom by water washing. Afterward, unreacted materials were removed therefrom to obtain resins. The results of measured yield and hue of the respective resins are set forth in Table 1.

COMPARATIVE EXAMPLE 1

By the use of the raw material oil and the autoclave employed in Example 1, the same polymerization and after-treatment as in Example 1 were repeated with the exception that the autoclave was not purged with nitrogen, in order to obtain a resin. The results of measured yield and hue of the resin are set forth in Table 1. In this case, the amount of oxygen in the system was 41.5 ml with respect to 100 g of the raw material oil.

TABLE 1

| | Example 1-1 | Example 1-2 | Example 1-3 | Comp. Ex. 1 |
|---|---|---|---|---|
| Amount of O$_2$ in System (ml/100 g of raw material oil) | 3.2 | 7.5 | 12.8 | 41.5 |
| Yield of Resin (wt %) | 64.3 | 63.5 | 62.0 | 49.4 |
| Hue of Melted Resin* (Gardner) | 5 | 5(+) | 6 | 10 |

*ASTM D-1544-58T

EXAMPLE 2

In this example, experiments were made for two samples.

A tar gas oil obtained from coal tar was distilled to prepare a fraction having a boiling point of 145° to 190° C. This fraction contained 34.0% of indene and methylindene, 6.8% of coumarone and methylcoumarone, 8.5% of styrene and 3.8% of other unsaturated components.

In each of one-liter stainless steel autoclaves equipped with a stirrer and a thermometer, 300 g of the thus prepared fraction was placed. The atmosphere in the autoclave was then replaced with a carbon dioxide gas in order to decrease the amount of oxygen therein.

When measured by the use of a gas chromatograph, it was confirmed that amounts of oxygen in the two autoclaves were 5.3 ml and 2.4 ml, respectively. Afterward, the system in each autoclave was heated up to about 60° C., and as a catalyst, 0.5 part by weight of boron trifluoride ethyl ether complex compound was added dropwise to the autoclave over about 30 minutes while the temperature in the system was maintained at a level of 75° to 80° C. and while a pressure was applied thereto with the nitrogen gas. The same procedure as in Example 1 was then carried out to obtain resins. The results of measured yield and hue of the resins are set forth in Table 2.

COMPARATIVE EXAMPLE 2

By the use of the raw material oil and the autoclave employed in Example 2, the same polymerization and after-treatment as in Example 2 were repeated with the exception that the autoclave was not purged with a carbon dioxide gas, in order to obtain a resin. The results of measured yield and hue of the resin are set forth in Table 2. In this case, the amount of oxygen in the system was 42.8 ml with respect to 100 g of the raw material oil.

TABLE 2

| | Example 2-1 | Example 2-2 | Comp. Ex. 2 |
|---|---|---|---|
| Amount of O$_2$ in System (ml/100 g of raw material oil) | 5.3 | 12.4 | 42.8 |
| Yield of Resin (wt %) | 43.3 | 42.0 | 32.5 |
| Hue of Melted Resin (Gardner) | 2 | 4 | 8 |

The results in Tables 1 and 2 indicate that the method of the present invention permits obtaining resins having an excellent hue in a high yield.

In the present invention, an aromatic coal fraction raw material, particularly a mixture of this fraction raw material and a phenol is polymerized, so that an indene-coumarone resin or a phenolic hydroxyl group-containing indene-coumarone resin having a heretofore unknown hue can be prepared.

This hydrocarbon resin having the excellent hue can be used, for example, as a tackifier for hot-melt adhesives and for acrylic adhesives, and as a binder for light-colored coating materials to which the conventional indene-coumarone resins cannot been applied. Therefore, it is fair to say that the light-colored indene-coumarone resin of the present invention has an extremely great value in industrial fields.

What is claimed is:

1. A method for preparing a light-colored indene-coumarone resin which comprises the step of polymerizing an aromatic coal fraction raw material having a boiling point of 140° to 240° C. in the presence of a Friedel-Crafts catalyst in a polymerization reactor in which the amount of oxygen is restricted to 15 ml or less with respect to 100 g of said aromatic coal fraction raw material oil at room temperature, wherein said Friedel-Crafts catalyst is selected from the group consisting of boron trifluoride, aluminum chloride, boron-trifluoride-phenol complex compounds and boron trifluoride-dialkyl ether complex compounds.

2. A method for preparing a light-colored indene-coumarone resin which comprises the step of polymerizing a raw material oil obtained by mixing an aromatic coal fraction having a boiling point of 140° to 240° C. with a phenol, in the presence of a Friedel-Crafts catalyst in a polymerization reactor in which the amount of oxygen is restricted to 15 ml or less with respect to 100 g of said raw material oil at room temperature, wherein said Friedel-Crafts catalyst is selected from the group consisting of boron trifluoride, aluminum chloride, boron trifluoride-phenol complex compounds and boron trifluoride-dialkyl ether complex compounds.

3. A method for preparing a light-colored indene-coumarone resin according to claim 2 wherein the amount of said phenol is from 1 to 30 parts by weight with respect to 100 parts by weight of said aromatic coal fraction.

4. A method for preparing a light-colored indene-coumarone resin according to claim 2 wherein said phenol is at least one selected from the group consisting of phenol, cresol, xylenol, t-butyl phenol and nonyl phenol.

* * * * *